United States Patent
Breitkopf et al.

(10) Patent No.: US 11,840,035 B2
(45) Date of Patent: Dec. 12, 2023

(54) PAD TRANSFER PRINTING METHOD FOR MAKING COLORED CONTACT LENSES

(71) Applicant: Alcon Inc., Fribourg (CH)

(72) Inventors: Richard Charles Breitkopf, Dunwoody, GA (US); Changhong Yin, Mansfield, TX (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 18/165,653

(22) Filed: Feb. 7, 2023

(65) Prior Publication Data

US 2023/0182423 A1   Jun. 15, 2023

Related U.S. Application Data

(62) Division of application No. 16/884,536, filed on May 27, 2020, now Pat. No. 11,602,910.

(60) Provisional application No. 62/853,246, filed on May 28, 2019.

(51) Int. Cl.
| | |
|---|---|
| *B29D 11/00* | (2006.01) |
| *C08L 83/04* | (2006.01) |
| *G02B 1/04* | (2006.01) |

(52) U.S. Cl.
CPC ........ *B29D 11/00903* (2013.01); *C08L 83/04* (2013.01); *G02B 1/043* (2013.01)

(58) Field of Classification Search
None
See application file for complete search history.

(56) References Cited

U.S. PATENT DOCUMENTS

| | | | | |
|---|---|---|---|---|
| 5,352,245 | A * | 10/1994 | Su .................... | D06P 3/008 8/507 |
| 5,637,265 | A * | 6/1997 | Misciagno ....... | B29D 11/00038 264/2.6 |
| 6,776,100 | B2 * | 8/2004 | Cutcher ................ | B41F 17/006 101/34 |
| 7,278,736 | B2 * | 10/2007 | Ocampo ................ | G02C 7/046 351/159.28 |
| 8,147,728 | B2 * | 4/2012 | Quinn .............. | B29D 11/00317 264/1.7 |
| 8,184,374 | B2 * | 5/2012 | Takahara .......... | B29D 11/00865 359/620 |
| 8,399,607 | B2 * | 3/2013 | April, Jr. ................. | C08G 64/00 528/480 |
| 10,364,365 | B2 * | 7/2019 | Breitkopf ............... | C09D 11/10 |

(Continued)

*Primary Examiner* — John J Figueroa
(74) *Attorney, Agent, or Firm* — Jian Zhou

(57) ABSTRACT

The invention relates to a pad printing instrument comprising an ink supply system capable of control the temperature, viscosity and colorant concentration of an ink in an ink cup. Such controls are achieved by continuously adding and mixing a cold ink having a composition identical to the ink in the ink cup but having a lower temperature. The continuous addition of a small amount of a cold ink into the ink cup could compensate heat generated by the friction between the ink cup and a cliché and could minimize the evaporation of a diluent in the ink and change in the concentration of colorants in the ink and ink viscosity. The invention also relates to use of a pad printing instrument comprising an ink supply system of the invention for producing colored hydrogel or silicone hydrogel contact lenses.

10 Claims, 1 Drawing Sheet

(56) References Cited

U.S. PATENT DOCUMENTS

| | | | | |
|---|---|---|---|---|
| 11,584,097 B2* | 2/2023 | Zhang | ................... | C08L 83/04 |
| 2003/0116047 A1* | 6/2003 | Cutcher | .............. | B41F 15/0895 |
| | | | | 101/493 |
| 2008/0273073 A1* | 11/2008 | Oakley | ............ | B29D 11/00019 |
| | | | | 347/103 |
| 2010/0027121 A1* | 2/2010 | Takahara | ......... | B29D 11/00903 |
| | | | | 359/570 |
| 2020/0376787 A1* | 12/2020 | Zhang | ................... | C08L 83/04 |

* cited by examiner

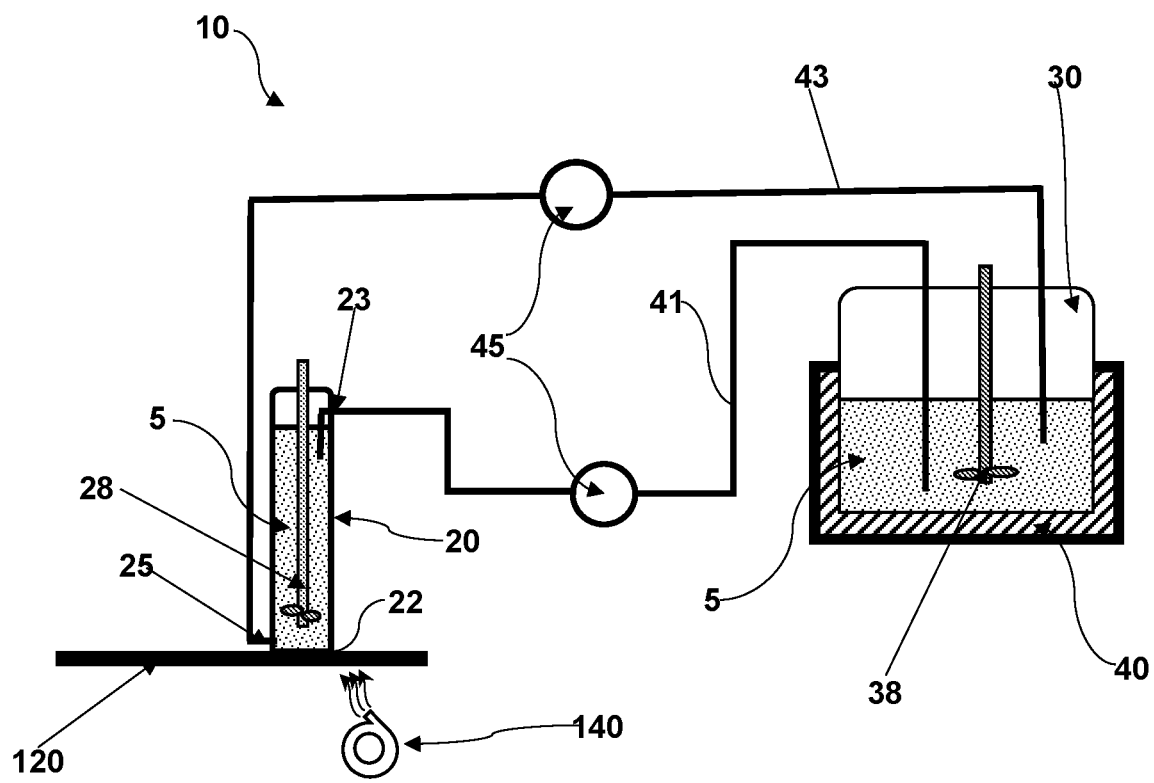

PAD TRANSFER PRINTING METHOD FOR MAKING COLORED CONTACT LENSES

This application is a divisional application of application Ser. No. 16/884,536, filed May 27, 2020, which claims the benefit under 35 USC § 119 (e) of U.S. provisional application No. 62/853,246 filed 28 May 2019, herein incorporated by reference in its entirety.

The present invention generally relates to a method for making colored contact lenses. More specifically, the present invention relates to a pad transfer printing method for making colored hydrogel or silicone hydrogel contact lenses with good image quality.

BACKGROUND OF THE INVENTION

Colored contact lenses can be produced by directly printing a colored image with an ink on a contact lens, or by indirectly printing a colored image with an ink on a contact lens according to a print-on-mold process or a modified print-on-mold process.

The print-on-mold process comprises first printing a colored image with an ink on a molding surface of a mold for cast-molding of a contact lens, dispensing a lens-forming composition in the mold with the colored image printed on one of the molding surface, and curing the lens-forming composition to obtain a cast-molded contact lens with the printed colored image which is transferred from the molding surface to the cast-molded contact lens during the curing process (see, U.S. Pat. No. 5,034,166).

The modified print-on-mold process comprises applying a transferable clear coating on a molding surface of a mold for casting-molding of a colored contact lens, printing a colored image with a pigment-containing ink on the transferable clear coating on the molding surface, dispensing a lens-forming composition in the mold with the colored image printed on the transferable clear coating on one of the molding surface, and curing the lens-forming composition to obtain a cast-molded contact lens with the printed colored image which is substantially covered by the clear coating and is, together with the transferable clear coating, transferred from the molding surface to the cast-molded contact lens during the curing process (see, e.g., U.S. Pat. No. 8,147,728).

Pad transfer printing has been widely used in the contact lens industry for printing inks onto contact lens (see, e.g., U.S. Pat. Nos. 3,536,386, 4,582,402, 4,704,017, 5,034,166). A typical example of this printing follows. An image pattern is engraved (etched) into a flat surface of a metal or ceramic plate to form a cliché (aka, a printing plate). In a pad transfer printer, an ink reservoir having the shape of a cup and containing an ink is inverted, placed on and held tightly against the cliché to form a closed ink cup. As the ink cup passes or travels over the image pattern engraved in the cliché, the engraved image pattern is flooded with ink. At the same time that the engraved image pattern is flooded with the ink, a doctor blade (e.g., a rim or lip of the ink cup) scrapes (wipes of) excess ink from the cliché back into the ink cup as the cliché moves underneath the ink cup, leaving ink only in the grooves forming the image. Then, a flexible silicone pad picks up the inked image from the cliché and transfers the image to the contact lens.

As inks for making colored silicone hydrogel contact lenses are typically solvent based, the solvent or thinner (diluent) would evaporate, resulting ink thickening. Such solvent evaporation can be accelerated due to heat generated by the friction between the cliché and the ink cup. Over time the viscosity of the ink would increase, and consequently the increased ink viscosity could adversely affect the ink flow characteristics required for achieving proper ink pick-up (from the cliché to the pad) and proper transfer (from the pad to the contact lens or other object) and for achieving good print quality. Furthermore, if the ink thickening occurs rapidly due to heat generated by cliché/ink cup friction, print intensities could change rapidly over the course of a processing cycle due to the increase in colorant's concentration and could get too "dark" too soon, non-uniform print intensity over time. Then, the ink in the cup needs to be replaced frequently, causing the downtime of the production of colored contact lenses.

Therefore, there is a need for an ink supply system for a pad printing system that provides the ability to maintain temperature of the ink in a closed ink cup and to minimize changes in ink viscosity and the concentration of colorants in the ink in the ink cup. There is also a need for producing colored contact lenses involving use of a pad printing system comprising such an ink supply system.

SUMMARY OF THE INVENTION

In one aspect, the invention provides a pad printing instrument, comprising: a silicone pad, a printing plate having a flat surface with an image pattern engraved thereon, and an ink supply system, wherein the ink supply system comprises (a) an ink cup containing the ink having a first temperature of from about 20° C. to about 30° C., (b) an ink container containing the ink having a second temperature being at least about 3° C. lower than the first temperature and in flow communication with the ink cup, (c) a thermostat for maintaining the ink in the ink container at the second temperature, (d) a first flow conduit, and (e) a second flow conduit, wherein the ink cup comprises (i) a cylindrical hollow structure defining an ink reservoir for holding the ink and defining an outer edge, wherein the outer edge having a scraping element thereon for engaging the printing plate, (ii) an ink cup inlet, (iii) an ink cup outlet, and (iv) a stirrer for continuously mixing the ink in the ink cup, wherein the first flow conduit extends between the ink container and the ink cup inlet for providing a flow of the ink having the second temperature from the ink container to the ink cup and for maintaining the temperature of the ink in the ink cup at the first temperature, wherein the second flow conduit extends between the ink container and the ink cup outlet for providing a flow of the ink having the first temperature from the ink cup to the ink container.

In another aspect, the invention provides a method for making a colored contact lens having a colored image thereon, comprising the steps of: (1) printing a colored image with an ink on a surface of a preformed contact lens by using a pad printing instrument of the invention as described above; (2) curing the colored image thermally or actinically on the surface of the preformed contact lens to form a colored contact lens with the cured colored image attached thereon; and (3) optionally but preferably applying a clear coating at least on the surface with the colored image thereon of the colored contact lens to cover completely the colored image.

In a further aspect, the invention provides a method for making a colored contact lens having a colored image thereon, comprising the steps of: (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed; (2) forming, on the first or second molding surface, a colored transferrable polymeric film, wherein the colored transferrable polymeric film is formed by: (a) applying a layer of a first polymerizable composition onto the first or second molding surface, wherein the first polymerizable composition is free of any pigment particle, (b) at least partially curing the first layer of the first polymerizable composition to form a first polymeric film on the first or second molding surface, (c) printing a colored image with at least one ink on the first polymeric film on the first or second molding surface by using a pad printing instrument of the invention as described above, (d) curing the colored images on the first polymeric film on the first or second molding surface, (e) optionally applying a second layer of a second polymerizable composition to completely cover the cured colored image on the first polymeric film, wherein the second polymerizable composition is free of any pigment particle and then followed by curing at least partially the second layer to form the second polymeric film which completely covers the cured colored image; (3) dispensing a lens-forming composition into the lens-forming cavity of the mold; and (4) curing the lens-forming composition within the lens-forming cavity to form the colored contact lens, whereby the colored transferrable polymeric film detaches from the first or second molding surface and becomes integral with the body of the colored contact lens.

BRIEF DESCRIPTIONS OF THE DRAWINGS

FIG. 1 illustrates schematically a pad printing instrument comprising an ink supply system according to a preferred embodiment of the invention.

DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "non-silicone hydrogel contact lens" refers to a contact lens comprising a non-silicone hydrogel bulk (core) material (i.e., lens body). A "silicone hydrogel contact lens" refers to a contact lens comprising a silicone hydrogel bulk (core) material (i.e., lens body).

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

As used in this application, the term "non-silicone hydrogel" refers to a hydrogel that is theoretically free of silicon.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens having a color image printed thereon and/or therein. A color image can be a cosmetic pattern, for example, iris-like patterns, Wild Eye™ patterns, made-to-order (MTO) patterns, and the like. A color image can be a single color image or a multi-color image.

The term "non-opaque" as used herein is intended to describe transparent or translucent color or a part of the lens that is uncolored or colored with transparent or translucent coloring.

"Colorant" means either a dye or a pigment or a mixture thereof that is used to print a color image on an article. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skilled in the art will know how to select colorants.

A "pigment" means a powdered substance that is suspended in a liquid in which it is insoluble. Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

An "actinically-crosslinkable binder polymer" refers to a polymer that comprises ethylenically-unsaturated groups and can be crosslinked actinically or thermally to trap or bind colorants onto or into a contact lens or a film such as that term is known in the art.

"Hydrophilic," as used herein, describes a material or portion thereof that will more readily associate with water than with lipids.

A "lens formulation" or "lens-forming composition" interchangeably refers to a polymerizable composition which can be cured (i.e., polymerized and/or crosslinked) thermally or actinically (i.e., by actinic radiation) to obtain a crosslinked polymer.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation. Thermal curing or actinic curing methods are well-known to a person skilled in the art.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.05% by weight at room temperature (i.e., from about 20° C. to about 27° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

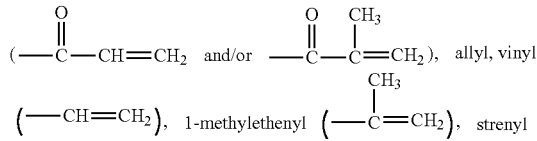

or the likes.

An "ene monomer" refers to a vinylic monomer comprising one sole vinyl group ($CH_2=CH-$) that is not covalently attached directly to an oxygen or nitrogen atom, a carbonyl group, or an aromatic ring.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

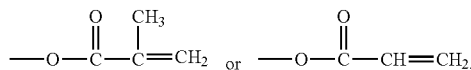

An "(meth)acrylamido monomer" refers to a vinylic monomer having one sole group of

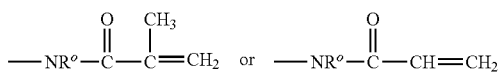

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group ($-CH=CH_2$) that is directly attached to the nitrogen atom of the amide group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth) acrylamido monomer), which typically yields a homopolymer that is insoluble in water and can absorb less than 10% by weight of water.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

A "macromer" or "prepolymer" refers to a compound or polymer that contains ethylenically unsaturated groups and has an average molecular weight of greater than 700 Daltons.

As used in this application, the term "polymer" means a material formed by polymerizing or crosslinking one or more monomers, macromers, prepolymers and/or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

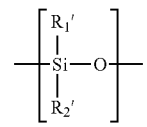

in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{y1}$—$OR^0$ (in which alk is $C_1$-$C_6$ alkyl diradical, $R^o$ is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3$'R$_4$', amino linkages of —NR$_3$'—, amide linkages of —CONR$_3$'—, amide of —CONR$_3$'R$_4$', urethane linkages of —OCONH—, and $C_1$-$C_4$ alkoxy group, or a linear hydrophilic polymer chain, in which R$_3$' and R$_4$' independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The invention relates to an ink supply system capable of control the temperature, viscosity and colorant concentration of an ink in an ink cup of a pad printing instrument. Such controls are achieved by continuously adding and mixing a colder ink having a composition identical to the ink in the ink cup but having a lower temperature. It is believed that the continuous addition of a small amount of a cold ink into the ink cup could compensate heat generated by the friction between the ink cup and a cliché (printing plate) and minimize the evaporation of a diluent in the ink and change in the concentration of colorants in the ink and ink viscosity. The invention also relates to an improved method for making colored contact lenses by using a pad printing system comprising an ink supply system of the invention.

The invention, in one aspect, provide a pad printing system, comprising: a silicone pad, a printing plate having a flat surface with an image pattern engraved thereon, and an ink supply system, wherein the ink supply system comprises (a) an ink cup containing the ink having a first temperature of from about 20° C. to about 30° C., (b) an ink container containing the ink having a second temperature being at least about 3° C. (preferably at least about 5° C., even more preferably about 10° C.) lower than the first temperature and in flow communication with the ink cup, (c) a thermostat for maintaining the ink in the ink container at the second temperature, (d) a first flow conduit, and (e) a second flow conduit, wherein the ink cup comprises (i) a cylindrical hollow structure defining an ink reservoir for holding the ink and defining an outer edge, wherein the outer edge having a scraping element thereon for engaging the printing plate, (ii) an ink cup inlet, (iii) an ink cup outlet, and (iv) a stirrer for continuously mixing the ink in the ink cup, wherein the first flow conduit extends between the ink container and the ink cup inlet for providing a flow of the ink having the second temperature from the ink container to the ink cup and for maintaining the temperature of the ink in the ink cup at the first temperature, wherein the second flow conduit extends between the ink container and the ink cup outlet for providing a flow of the ink having the first temperature from the ink cup to the ink container.

Any known suitable silicone pad can be used in the present invention. Silicone pads are commercially available. However, different pads could give different print qualities. A person skilled in the art will know how to select a pad for a given ink.

A printing plate can be made of ceramics or metals (e.g., steel), as known to a person skilled in the art.

FIG. 1 illustrates schematically an ink supply system (10) of the invention. The system comprises: an ink cup (20); an ink container (30); a thermostat (40); a first flow conduit (41); and a second flow conduit (43).

The ink cup (20) comprises: a cylindrical hollow structure defining an ink reservoir for holding the ink (5) and defining an outer edge (22); an ink cup inlet (23); an ink cup outlet (25); and a stirrer (28) for continuously mixing the ink in the ink cup. The cylindrical hollow structure typically has a length (e.g., about 40 mm to about 120 mm) sufficient for containing a sufficient amount of the ink (5) for printing a desired number (e.g., 5000) of contact lenses or molds. The temperature of the ink in the ink cup is from about 20° C. to about 30° C. The diameter of the cylindrical hollow structure should be larger than the image pattern engraved on the flat surface of the printing plate or so-called cliché (120) and typically is at least about 15 mm. The outer edge (22) has a scraping element thereon for engaging the printing plate (120). In operation, the ink cup (20) is inverted and held against the flat surface (having the engraved image pattern) of the printing plate (120).

The ink container (30) contains the ink (5), which differs from the ink in the ink cup only in temperature. The ink in the ink container has a temperature being at least about 5° C. (preferably at least about 10° C.) lower than the temperature of the ink in the ink cup. The thermostat (40) maintains the temperature of the ink in the ink container. The stirrer (38) mixing continuously the ink in the ink container.

The first flow conduit (41) extends between the ink container (30) and the ink cup inlet (23) for providing a flow of the cold ink from the ink container (30) to the ink cup (20) so as to compensate heat generated by friction between the ink cup (20) and the printing plate (120) during operation.

The second flow conduit (43) extends between the ink container (30) and the ink cup outlet (25) for providing a flow of the ink having the first temperature from the ink cup to the ink container. The flow of the ink (5) between the ink cup (20) and the ink container (30) are carried out by using pumps (45) as known to a person skilled in the art.

In one embodiment, the first flow conduit (41) operates continuously to feed the cold ink into the ink cup at a flow rate (ml of ink per second) which is equal to or slightly lower than consumption rate of the ink (i.e., ml of ink inked to the engraved image pattern per second), while the second flow conduit (43) operates occasionally on demand to ensure no overflow the ink cup.

In another embodiment, the first flow conduit (41) and the second flow conduit (43) continuously operates in synchrony with each other to ensure no net increase in ink level in the ink cup.

In a further preferred embodiment, the printing plate (120) is directly or indirectly cooled with a cooling device or a cold air blower (140) (such as, a VORTEC Cold Air Gun) by blowing cold air onto the backside of the printing plate (120). The effects of heat generated by the friction between the printing plate and the ink cup upon the temperature of the printing plate can be minimized.

In operation, as the ink cup (20) passes or travels over the image pattern engraved in the printing plate (120), the engraved image pattern is flooded with ink (5). At the same time that the engraved image pattern is flooded with the ink, a doctor blade (e.g., a rim or lip of the ink cup) scrapes (wipes of) excess ink from the printing plate back into the ink cup (20) as the printing plate moves underneath the ink cup (20), leaving ink only in the grooves forming the image. Then, a flexible silicone pad (no shown) picks up the inked image from the printing plate and transfers the image to a contact lens or a mold.

In another aspect, the invention provides a method for making a colored contact lens having a colored image thereon, comprising the steps of: (1) printing a colored image with an ink on a surface of a preformed contact lens by using a pad printing instrument of the invention as described above; (2) curing the colored image thermally or actinically on the surface of the preformed contact lens to form a colored contact lens with the cured colored image attached thereon; and (3) optionally but preferably applying a clear coating at least on the surface with the colored image thereon of the colored contact lens to cover completely the colored image.

In a further aspect, the invention provides a method for making a colored contact lens having a colored image thereon, comprising the steps of: (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed; (2) forming, on the first or second molding surface, a colored transferrable polymeric film, wherein the colored transferrable polymeric film is formed by: (a) applying a layer of a first polymerizable composition onto the first or second molding surface, wherein the first polymerizable composition is free of any pigment particle, (b) at least partially curing the first layer of the first polymerizable composition to form a first polymeric film on the first or second molding surface, (c) printing a colored image with at least one ink on the first polymeric film on the first or second molding surface by using a pad printing instrument of the invention as described above, (d) curing the colored images on the first polymeric film on the first or second molding surface, (e) optionally applying a second layer of a second polymerizable composition to completely cover the cured colored image on the first polymeric film, wherein the second polymerizable composition is free of any pigment particle and then followed by curing at least partially the second layer to form the second polymeric film which completely covers the cured colored image; (3) dispensing a lens-forming composition into the lens-forming cavity of the mold; and (4) curing the lens-forming composition within the lens-forming cavity to form the colored contact lens, whereby the colored transferrable polymeric film detaches from the first or second molding surface and becomes integral with the body of the colored contact lens.

Any ink suitable for making colored contact lenses can be used in the invention and have been described in the patents and patent applications. For example, U.S. Pat. Nos. 4,668,240, 4,857,072, 5,272,010, 5,414,477, 6,955,832, 7,329,695, 7,354,959, 7,411,008, 7,550,519, 7,723,402, 8,147,728, 8,344,046, 8,622,543, 8,920,873, and 9,880,324 and U.S. Pat. Appl. Pub. No. 2017/0183520A1 discloses various inks suitable for making colored non-silicone hydrogel contact lenses and colored silicone hydrogel contact lenses. Typically, an ink comprises at least one silicone free or silicone-containing binder polymer (preferably, at least one silicone-free or silicone-containing actinically-crosslinkable binder polymer) and one or more diluents (organic solvent, vinylic monomers, vinylic crosslinkers, etc.) as well as other components known to a persons killed in the art.

In accordance with the invention, a preformed contact lens is a contact lens that has not been printed with a colored image. For example, preformed contact lenses can be produced in a conventional "spin-casting mold," as described for example in U.S. Pat. No. 3,408,429, or by the full cast-molding process in a static form, as described in U.S. Pat. Nos. 4,347,198, 5,508,317, 5,583,463, 5,789,464, and 5,849,810, or by lathe cutting of buttons as used in making customized contact lenses. In cast-molding, a lens formulation typically is dispensed into molds and cured (i.e., polymerized and/or crosslinked) in molds for making contact lenses.

Preformed non-silicone hydrogel contact lenses can be any commercially-available non-silicone hydrogel contact lenses or can be produced according to any known methods. For production of preformed non-silicone hydrogel contact lenses, a lens-forming composition typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a vinylic crosslinker, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed non-silicone hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489; all of which are incorporated herein by references in their entireties.

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

Preformed silicone hydrogel contact lenses can be any commercially-available silicone hydrogel contact lenses or can be produced according to any known methods. For example, for production of preformed silicone hydrogel (SiHy) contact lenses, a SiHy lens forming composition (or SiHy lens formulation) for cast-molding or spin-cast molding or for making SiHy rods used in lathe-cutting of contact lenses generally comprises at least one silicone-containing polymerizable components (e.g., a silicone-containing vinylic monomer, a silicone-containing vinylic crosslinker, a silicone-containing prepolymer, or combinations thereof), at least one hydrophilic vinylic monomer, and one or more other polymerizable components (e.g., a hydrophobic vinylic monomer, a non-silicone vinylic crosslinker, or combinations thereof), a free-radical initiator (photoinitiator or thermal initiator), and combination thereof, as well known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

Numerous SiHy lens formulations have been described in numerous patents and patent applications published by the filing date of this application. All of them can be used in obtaining a preformed SiHy lens. A SiHy lens formulation for making commercial SiHy lenses, such as, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A can also be used in making preformed SiHy contact lenses or colored silicone hydrogel contact lenses.

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy) silyl group, polysiloxane vinylic monomers, 3-methacryloxy propylpentamethyldisiloxane, t-butyldimethyl-siloxyethyl vinyl carbonate, tri methylsilylethyl vinyl carbonate, and tri methylsilylmethyl vinyl carbonate, and combinations thereof.

Examples of preferred vinylic monomers each having a bis(trialkylsilyloxy)alkylsilyl group or a tris(trialkylsilyloxy)silyl group include without limitation tris(trimethylsilyloxy)-silylpropyl (meth)acrylate, [3-(meth)acryloxy-2-hydroxypropyloxy]propylbis(trimethylsiloxy)-methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)-silylpropyl]-(meth) acrylamide, N-(2-hydroxy-3-(3-(bis(trimethylsilyloxy) methylsilyl)propyloxy)-propyl)-2-methyl (meth) acrylamide, N-(2-hydroxy-3-(3-(bis(trimethylsilyloxy) methylsilyl)-propyloxy)propyl) (meth)acrylamide, N-(2-hydroxy-3-(3-(tris(trimethylsilyloxy)silyl)propyloxy)-propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy) silylpropyl] (meth)acrylamide, N,N-bis[2-hydroxy-3-(3-(bis (trimethylsilyloxy)methylsilyl)propyloxy)propyl]-2-methyl (meth)acrylamide, N,N-bis[2-hydroxy-3-(3-(bis(trimethylsilyloxy)methylsilyl)-propyloxy)propyl] (meth)acrylamide, N,N-bis[2-hydroxy-3-(3-(tris(trimethylsilyloxy)silyl)ropyloxy)propyl]-2-methyl (meth)acrylamide, N,N-bis[2-hydroxy-3-(3-(tris(trimethylsilyloxy)-silyl)propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris (trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 7,214,809, 8,475,529, 8,658,748, 9,097,840, 9,103,965, and 9,475,827.

Examples of preferred polysiloxane vinylic monomers include without limitation mono-(meth)acryloyl-terminated, monoalkyl-terminated polysiloxanes of formula (I) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth) acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxyethylamino-2-hydroxypropyloxypropyl]-terminated ω-butyl (or ω-methyl) terminated polydimethylsiloxane, α-[3-

(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-[3-(meth)acryloxy (polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamidopropyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamidobutyloxy-2-hydroxypropyloxypropyl]-terminated ω-butyl (or ω-methyl) terminated polydimethylsiloxane, α[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxypropyl] terminated ω-butyl (or ω-methyl) terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,867,245, 8,415,405, 8,475,529, 8,614,261, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Any suitable silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

Examples of preferred di-(meth)acryloyloxy-terminated polysiloxane vinylic crosslinkers includes without limitation the reaction products of glycidyl methacrylate with di-amino-terminated polydimethylsiloxanes; the reaction products of glycidyl methacrylate with di-hydroxyl-terminated polydimethylsiloxanes; the reaction products of isocyantoethyl (meth)acrylate with di-hydroxyl-terminated polydimethylsiloxanes; di-(meth)acryloyloxy-terminated polysiloxane vinylic crosslinkers each having hydrophilized siloxane units each having one methyl substituent and one monovalent $C_4$-$C_{40}$ organic radical substituent having 2 to 6 hydroxyl groups as disclosed in U.S. Pat. Appl. Pub. No. 2017/0166673 A1; chain-extended polysiloxabe vinylic crosslinkers disclosed in US201008843A1 and US20120088844A1; chain-extended polysiloxane vinylic crosslinkers described in U.S. Pat. Nos. 5,034,461, 5,416,132, 5,449,729, 5,760,100, 7,423,074, and 8,529,057; chain-extended polysiloxane vinylic crosslinkers described U.S. Pat. App. Pub. Nos. 2018/0100053 A1 and 2018/0100038 A1; chain-extended polysiloxane vinylic crosslinkers described in U.S. Pat. No. 8,993,651; α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxy-propyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]- terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis-[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane.

Any hydrophilic vinylic monomers can be used in the invention. Examples of preferred hydrophilic vinylic monomers are alkyl (meth)acrylamides (as described below), hydroxyl-containing acrylic monomers (as described below), amino-containing acrylic monomers (as described below), carboxyl-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers(as described below), N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing ($=CH_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation allyl alcohol, ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)

acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethyl phosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethyammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethylthio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy) methylethyl)benzene, 1,1-bis(tert-butylperoxy)-3,3,5-trimethylcyclohexane, di-t-butyl-diperoxyphthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 29590, Germanium-based Norrish Type I photoinitiators (e.g., those described in U.S. Pat. No. 7,605,190, herein incorporated by reference in its entirety). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety.

Any silicon-containing prepolymers comprising hydrophilic segments and hydrophobic segments can be used in the invention. Examples of such silicone-containing prepolymers include those described in commonly-owned U.S. Pat. Nos. 6,039,913, 7,091,283, 7,268,189, 7,238,750, 7,521,519, 8,383,744, and 8,642,712; and U.S. Pat. Appl. Pub. Nos. 2008/0015315A1, 2008/0143958A1, 2008/0143003A1, 2008/0234457A1, and 2008/0231798A1.

A SiHy contact lens formulation can also comprise other necessary components known to a person skilled in the art, such as, for example, a UV-absorbing vinylic monomer, a HEVL-absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants, leachable tear-stabilizing agents, and mixtures thereof, as known to a person skilled in the art.

A lens-forming composition (non-SiHy or SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers include $C_1$-$C_{10}$ alkyl (meth)acrylate (e.g., methyl (meth)acrylate, ethyl (meth) acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth) acrylate, hexafluorobutyl (meth)acrylate, or combinations thereof. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl butene, 4-hydroxy-4-methyl-1-cyclopentanol, 2-phenyl-2-propanol, 2-methoxy-2-methyl propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

A SiHy lens formulation (i.e., lens-forming composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Lens molds for making contact lenses are well known to a person skilled in the art and, for example, are employed in cast molding. In general, a mold comprises at least two mold halves (or mold sections), one male half and one female mold half. The male mold half has a first molding (or optical) surface which is in direct contact with a polymerizable composition for cast molding of a contact lens and defines the posterior (concave) surface of a molded contact lens; and the female mold half has a second molding (or optical) surface which is in direct contact with the polymerizable composition and defines the anterior (convex) surface of the molded contact lens. The male and female mold halves are configured to receive each other such that a lens-forming cavity is formed between the first molding surface and the second molding surface. The molding surface of a mold half is the cavity-forming surface of the mold and in direct contact with lens-forming material. Examples of preferred molds are those described in U.S. Pat. Appl. Pub. No. 2018/0104919.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Polar plastic molds can preferably be used to produce silicone hydrogel contact lenses having a much better wettability than non-polar plastic molds (e.g., polypropylene molds) (see, Lai and Friends, "Surface Wettability Enhancement of Silicone Hydrogel Lenses by Processing with Polar Plastic Molds", *J. Biomed. Mat. Res.* 35(3): 349-356 (1997); U.S. Pat. No. 5,352,714).

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002.

Reusable molds can also be used and the lens-forming composition is cured actinically under a spatial limitation of actinic radiation to form a contact lens. Examples of preferred reusable molds are those disclosed in U.S. Pat. Nos.

6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In a preferred embodiment, the first and second polymerizable composition independent of each other comprises at least one actinically-crosslinkable binder polymer used in the ink for printing the colored image.

In another preferred embodiment, the first and second polymerizable composition independent of each other comprises the polymerizable components of the lens-forming composition.

A first layer of a first polymerizable composition can be applied to a molding surface of mold by any suitable techniques, such as, for example, spraying, printing, swabbing, or dipping. For example, the first layer with substantially uniform thickness (e.g., up to 5 microns) can be prepared by spraying a molding surface with the first polymerizable composition (as described above). Similarly, a second layer of a second polymerizable composition can be applied to the first polymeric film having a colored image thereon on a molding surface of the mold.

The first and second layers of the first and second polymerizable compositions can be cured thermally but preferably actinically by irradiating them with a UV/visible radiation, as well known to a person skilled in the art. Preferably, curing of the first and second layers is not complete, namely, does not consume all of ethylenically unsaturated groups of the polymerizable components in the first and second polymerizable composition. Unreacted ethylenically unsaturated or other crosslinkable groups in the ink can copolymerize with the polymerizable components of the lens-forming composition, which has penetrated into the first and second polymeric film, during the step of thermally curing the lens-forming composition within the lens-forming cavity of the mold to form the colored contact lens.

It is believed that even if the first and second layers of the polymerizable compositions are completely cured, the polymerizable components of the lens-forming composition can be crosslinked in the presence of the polymeric materials of the colored transferable polymeric film on the first or second molding surface to form interpenetrating polymer networks (IPNs). Adhesion of the colored transferable polymeric film to the lens by IPN formation does not require the presence of reactive functional groups in the lens polymer. A colored transferable polymeric film can be formed first according to the invention on a molding surface of a mold for making a contact lens. Then, a lens-forming composition is dispensed in the mold. The lens-forming composition is allowed to penetrate into the colored transferable polymeric film and then be cured to form a colored contact lens onto which the colored transferable polymeric film is transferred from the mold.

In accordance with the invention, the polymerizable composition can be introduced (dispensed) into a cavity formed by a mold according to any known methods.

After the lens-forming composition is dispensed into the mold, it is polymerized to produce a contact lens. Crosslinking may be initiated thermally or actinically to crosslink the polymerizable components in the lens-forming composition.

The thermal polymerization is carried out conveniently in an oven at elevated temperature, for example at a temperature of from 40° C. to 100° C. The reaction time may vary within wide limits, but is conveniently, for example, from 1 to 24 hours or preferably from 1 to 12 hours. It is advantageous to previously degas the components and solvents used in the polymerization reaction and to carry out said copolymerization reaction under an inert atmosphere, for example under a nitrogen or argon atmosphere.

Opening of the mold so that the molded article can be removed from the mold may take place in a manner known per se.

The molded colored silicone hydrogel contact lens can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

After extraction, the colored silicone hydrogel contact lens can further subject to further processes, such as, for example, surface treatment (especially the surface treatments described in U.S. Pat. Nos. 8,529,057 and 9,505,184), hydration, packaging in lens packages with a packaging solution which is well known to a person skilled in the art; sterilization such as autoclave at from 118-124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A pad printing instrument, comprising: a silicone pad, a printing plate having a flat surface with an image pattern engraved thereon, and an ink supply system, wherein the ink supply system comprises
   (a) an ink cup containing the ink having a first temperature of from about 20° C. to about 30° C.,
   (b) an ink container containing the ink having a second temperature being at least about 3° C. lower than the first temperature and in flow communication with the ink cup, (c) a thermostat for maintaining the ink in the ink container at the second temperature,
(d) a first flow conduit, and
(e) a second flow conduit, wherein the ink cup comprises
  (i) a cylindrical hollow structure defining an ink reservoir for holding the ink and defining an outer edge, wherein the outer edge having a scraping element thereon for engaging the printing plate,
  (ii) an ink cup inlet,
  (iii) an ink cup outlet, and
  (iv) a stirrer for continuously mixing the ink in the ink cup,
wherein the first flow conduit extends between the ink container and the ink cup inlet for providing a flow of the ink having the second temperature from the ink container to the ink cup and for maintaining the temperature of the ink in the ink cup at the first temperature, wherein the second flow conduit extends between the ink container and the ink cup outlet for providing a flow of the ink having the first temperature from the ink cup to the ink container.

2. The pad printing instrument of embodiment 1, wherein the second temperature of the ink in the ink container is maintained at a temperature being about 5° C. or about 10° C. lower than the first temperature of the ink in the ink cup.

3. The pad printing instrument of embodiment 1 or 2, wherein the scraping element is a rim or lip of the ink cup.

4. The pad printing instrument of any one of embodiments 1 to 3, wherein the cylindrical hollow structure has a diameter of at least about 15 mm and a length of from about 40 mm to about 120 mm.

5. The pad printing instrument of any one of embodiments 1 to 4, wherein the first flow conduit operates continuously to feed the ink having the second temperature into the ink cup at a flow rate (ml of ink per second) which is equal to or slightly lower than consumption rate of the ink (ml of ink inked to the engraved image pattern per second), while the second flow conduit operates occasionally on demand to ensure no overflow the ink cup.

6. The pad printing instrument of any one of embodiments 1 to 5, wherein the first flow conduit and the second flow conduit continuously operates in synchrony with each other to ensure no net increase in ink level in the ink cup.

7. The pad printing instrument of any one of claims 1 to 6, further comprising a cold air blower which blows cold air onto back side of the printing plate to directly or indirectly cool the temperature of the printing plate.

8. A method for producing colored contact lenses, comprising the steps of:
  (1) printing a colored image with an ink on a surface of a preformed contact lens by using the pad printing instrument of any one of embodiments 1 to 7; and
  (2) curing the colored image thermally or actinically on the surface of the preformed contact lens to form a colored contact lens with the cured colored image attached thereon.

9. The method of embodiment 8, further comprising a step of applying a clear coating at least on the surface with the colored image thereon of the colored contact lens to cover completely the colored image.

10. A method for producing colored contact lenses, comprising the steps of:
  (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed;
  (2) forming, on the first or second molding surface, a colored transferrable polymeric film, wherein the colored transferrable polymeric film is formed by:
    (a) applying a layer of a first polymerizable composition onto the first or second molding surface, wherein the first polymerizable composition is free of any pigment particle,
    (b) at least partially curing the layer of the first polymerizable composition to form a first polymeric film on the first or second molding surface,
    (c) printing a colored image with at least one ink on the first polymeric film on the first or second molding surface by using the pad printing instrument of any one of embodiments 1 to 7,
    (d) curing the colored images on the first polymeric film on the first or second molding surface, and
    (e) optionally applying a layer of a second polymerizable composition on top of the first polymeric film to completely cover the cured colored image on the first polymeric film, wherein the second polymerizable composition is free of any pigment particle and then is curing at least partially to form the second polymeric film which completely covers the cured colored image;
  (3) dispensing a lens-forming composition into the lens-forming cavity of the mold; and
  (4) curing the lens-forming composition within the lens-forming cavity to form the colored contact lens, whereby the colored transferrable polymeric film detaches from the first or second molding surface and becomes integral with the body of the colored contact lens.

11. The method of embodiment 10, wherein the colored transferable polymeric firm comprises the first and second polymeric films and the cured colored image encapsulated between the first and second polymeric film.

12. The method of embodiment 10 or 11, wherein the layers of the first and second polymerizable composition and the colored image are cured actinically by use of a UV/visible radiation, wherein the first and second polymerizable composition and the ink comprise a photoinitiator.

13. The method of any one of embodiments 10 to 12, wherein the lens-forming composition is cured thermally.

14. The method of any one of embodiments 10 to 13, wherein the first and second polymerizable compositions and the ink independent of one another comprise an actinically-crosslinkable binder polymer.

15. The method of any one of embodiments 10 to 14, wherein the ink comprises an organic solvent and at least one vinylic monomer.

16. The method of any one of embodiments 8 to 15, wherein the colored contact lens is a colored non-silicone hydrogel contact lens.

17. The method of any one of embodiments 8 to 15, wherein the colored contact lens is a colored silicone hydrogel contact lens.

The previous disclosure will enable one having ordinary skill in the art to practice the invention. Various modifications, variations, and combinations can be made to the various embodiment described herein.

All the publications, patents, and patent application publications, which have been cited herein above, are hereby incorporated by reference in their entireties.

What is claimed is:

1. A method for producing colored contact lenses, comprising the steps of:
    (1) printing a colored image with an ink on a surface of a preformed contact lens by using a pad printing instrument that comprises a silicone pad, a printing plate having a flat surface with an image pattern engraved thereon, and an ink supply system, wherein the ink supply system comprises (a) an ink cup containing the ink having a first temperature of from about 20° C. to about 30° C., (b) an ink container containing the ink having a second temperature being at least about 3° C. lower than the first temperature and in flow communication with the ink cup, (c) a thermostat for maintaining the ink in the ink container at the second temperature, (d) a first flow conduit, and (e) a second flow conduit, wherein the ink cup comprises (i) a cylindrical hollow structure defining an ink reservoir for holding the ink and defining an outer edge, wherein the outer edge having a scraping element thereon for engaging the printing plate, (ii) an ink cup inlet, (iii) an ink cup outlet, and (iv) a stirrer for continuously mixing the ink in the ink cup, wherein the first flow conduit extends between the ink container and the ink cup inlet for providing a flow of the ink having the second temperature from the ink container to the ink cup and for maintaining the temperature of the ink in the ink cup at the first temperature, wherein the second flow conduit extends between the ink container and the ink cup outlet for providing a flow of the ink having the first temperature from the ink cup to the ink container; and
    (2) curing the colored image thermally or actinically on the surface of the preformed contact lens to form a colored contact lens with the cured colored image attached thereon.

2. The method of claim 1, further comprising a step of applying a clear coating at least on the surface with the colored image thereon of the colored contact lens to cover completely the colored image.

3. A method for producing colored contact lenses, comprising the steps of:
    (1) obtaining a mold which comprises a female mold half having first molding surface and a male mold half having a second molding surface, wherein the male and female mold halves are configured to receive each other such that a lens-forming cavity is formed between the first and second molding surfaces when the mold is closed;
    (2) forming, on the first or second molding surface, a colored transferrable polymeric film, wherein the colored transferrable polymeric film is formed by:
        (a) applying a layer of a first polymerizable composition onto the first or second molding surface, wherein the first polymerizable composition is free of any pigment particle,
        (b) at least partially curing the layer of the first polymerizable composition to form a first polymeric film on the first or second molding surface,
        (c) printing a colored image with at least one ink on the first polymeric film on the first or second molding surface by using a pad printing instrument that comprises a silicone pad, a printing plate having a flat surface with an image pattern engraved thereon, and an ink supply system, wherein the ink supply system comprises (i) an ink cup containing the ink having a first temperature of from about 20° C. to about 30° C., (ii) an ink container containing the ink having a second temperature being at least about 3° C. lower than the first temperature and in flow communication with the ink cup, (iii) a thermostat for maintaining the ink in the ink container at the second temperature, (iv) a first flow conduit, and (v) a second flow conduit, wherein the ink cup comprises a) a cylindrical hollow structure defining an ink reservoir for holding the ink and defining an outer edge, wherein the outer edge having a scraping element thereon for engaging the printing plate, b) an ink cup inlet, c) an ink cup outlet, and d) a stirrer for continuously mixing the ink in the ink cup, wherein the first flow conduit extends between the ink container and the ink cup inlet for providing a flow of the ink having the second temperature from the ink container to the ink cup and for maintaining the temperature of the ink in the ink cup at the first temperature, wherein the second flow conduit extends between the ink container and the ink cup outlet for providing a flow of the ink having the first temperature from the ink cup to the ink container,
        (d) curing the colored images on the first polymeric film on the first or second molding surface, and
        (e) optionally applying a layer of a second polymerizable composition on top of the first polymeric film to completely cover the cured colored image on the first polymeric film, wherein the second polymerizable composition is free of any pigment particle and then is curing at least partially to form the second polymeric film which completely covers the cured colored image;
    (3) dispensing a lens-forming composition into the lens-forming cavity of the mold; and
    (4) curing the lens-forming composition within the lens-forming cavity to form the colored contact lens, whereby the colored transferrable polymeric film detaches from the first or second molding surface and becomes integral with the body of the colored contact lens.

4. The method of claim 3, wherein the colored transferable polymeric firm comprises the first and second polymeric films and the cured colored image encapsulated between the first and second polymeric film.

5. The method of claim 4, wherein the layers of the first and second polymerizable composition and the colored image are cured actinically by use of a UV/visible radiation, wherein the first and second polymerizable composition and the ink comprise a photoinitiator.

6. The method of claim 5, wherein the lens-forming composition is cured thermally.

7. The method of claim 6, wherein the first and second polymerizable compositions and the ink independent of one another comprise an actinically-crosslinkable binder polymer.

8. The method of claim 7, wherein the ink comprises an organic solvent and at least one vinylic monomer.

9. The method of claim 8, wherein the colored contact lens is a colored non-silicone hydrogel contact lens.

10. The method of claim 8, wherein the colored contact lens is a colored silicone hydrogel contact lens.

* * * * *